United States Patent
Marusczyk et al.

(10) Patent No.: US 10,411,248 B2
(45) Date of Patent: *Sep. 10, 2019

(54) ELECTRODE FOR A LITHIUM CELL

(71) Applicant: ROBERT BOSCH GMBH, Stuttgart (DE)

(72) Inventors: Anika Marusczyk, Stuttgart (DE); Bernd Schumann, Rutesheim (DE); Ingo Kerkamm, Stuttgart-Rohr (DE); Malte Rolff, Stockelsdorf (DE); Thomas Eckl, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 175 days.

This patent is subject to a terminal disclaimer.

(21) Appl. No.: 15/127,657

(22) PCT Filed: Mar. 12, 2015

(86) PCT No.: PCT/EP2015/055214
§ 371 (c)(1),
(2) Date: Sep. 20, 2016

(87) PCT Pub. No.: WO2015/140049
PCT Pub. Date: Sep. 24, 2015

(65) Prior Publication Data
US 2018/0175367 A1    Jun. 21, 2018

(30) Foreign Application Priority Data
Mar. 21, 2014   (DE) .................. 10 2014 205 356

(51) Int. Cl.
*H01M 4/131* (2010.01)
*H01M 4/1391* (2010.01)
(Continued)

(52) U.S. Cl.
CPC ......... *H01M 4/131* (2013.01); *H01M 4/1391* (2013.01); *H01M 4/366* (2013.01);
(Continued)

(58) Field of Classification Search
CPC .... H01M 4/131; H01M 4/1391; H01M 4/366; H01M 4/485; H01M 4/505; H01M 4/525;
(Continued)

(56) References Cited

U.S. PATENT DOCUMENTS 9,819,011 B2 * 11/2017 Eckl ........................ C01G 53/50
2002/0114995 A1    8/2002 Thackeray et al.
(Continued)

FOREIGN PATENT DOCUMENTS

CN    102969497 A  *  3/2013
JP    07192763 A  *  7/1995
(Continued)

OTHER PUBLICATIONS

Zhang et al., "Effects on electrochemical performances for host material caused by structure change of modifying material"; Phys. Chem.Chem.Phys., 2014, 16, pp. 17792-17798 (available Jun. 18, 2014). (Year: 2014).*

(Continued)

*Primary Examiner* — Gregg Cantelmo
(74) *Attorney, Agent, or Firm* — Norton Rose Fulbright US LLP; Gerard Messina

(57) ABSTRACT

An electrode, in particular, a cathode, for an electrochemical energy store, in particular, for a lithium cell, including particles having one first lithiatable active material, which is based on a transition metal oxide, wherein the particles or a base body including the particles is/are provided with at least one functional layer, which is lithium ion-conductive and includes at least one redox-active element. An energy (Continued)

store including such an electrode, and a method for manufacturing such an electrode, are also described.

22 Claims, 2 Drawing Sheets

(51) Int. Cl.
| | |
|---|---|
| *H01M 4/36* | (2006.01) |
| *H01M 4/485* | (2010.01) |
| *H01M 4/505* | (2010.01) |
| *H01M 4/525* | (2010.01) |
| *H01M 10/052* | (2010.01) |
| *H01M 4/62* | (2006.01) |
| *H01M 10/0525* | (2010.01) |
| *H01M 4/02* | (2006.01) |
| *H01M 4/04* | (2006.01) |

(52) U.S. Cl.
CPC .......... *H01M 4/485* (2013.01); *H01M 4/505* (2013.01); *H01M 4/525* (2013.01); *H01M 4/621* (2013.01); *H01M 10/052* (2013.01); *H01M 10/0525* (2013.01); *H01M 4/043* (2013.01); *H01M 4/364* (2013.01); *H01M 2004/027* (2013.01); *H01M 2004/028* (2013.01); *Y02T 10/7011* (2013.01)

(58) Field of Classification Search
CPC ...... H01M 4/621; H01M 4/043; H01M 4/364; H01M 10/052; H01M 10/0525; H01M 2004/027; H01M 2004/028; Y02T 10/7011

See application file for complete search history.

(56) References Cited

U.S. PATENT DOCUMENTS

| | | |
|---|---|---|
| 2005/0186474 A1 | 8/2005 | Jiang et al. |
| 2009/0301866 A1 | 12/2009 | Zaghib et al. |
| 2011/0076556 A1 | 3/2011 | Karthikeyan et al. |
| 2011/0195309 A1* | 8/2011 | Nina ..................... H01M 4/485 429/223 |
| 2013/0143128 A1 | 6/2013 | Mochida et al. |
| 2015/0171427 A1* | 6/2015 | Eckl ..................... C01G 53/50 427/126.3 |

FOREIGN PATENT DOCUMENTS

| | | | |
|---|---|---|---|
| JP | 200031919 A | | 8/2000 |
| JP | 2000260470 A | * | 9/2000 |
| JP | 2001043847 A | | 2/2001 |
| JP | 2001043849 A | | 2/2001 |
| JP | 2009146811 A | | 7/2009 |
| JP | 2011070789 A | | 4/2011 |
| JP | 2012129166 A | | 7/2012 |
| JP | 2013243107 A | | 12/2013 |

OTHER PUBLICATIONS http://abulafia.mt.ic.ac.uk/shannon/radius.php?Elennent=Nb—listing of ionic radii for Niobium (Year: 2014).*
Ohta et al., "LiNbO3-coated LiCoO2 as cathode material for all solid-state lithium secondary batteries" Electrochemistry Communications, Elsevier, Jun. 15, 2007, 1486-1490, Amsterdam, NL.
http://abulafia.mt.ic.ac.uk/Shannon/ptable.php, Mar. 21, 2014.
International Search Report dated Jun. 11, 2015, of the corresponding International Application PCT/EP/2015/055214, filed on Mar. 12, 2015.

* cited by examiner

ELECTRODE FOR A LITHIUM CELL

FIELD

The present invention relates to an electrode and an electrochemical energy store including such an electrode, as well as a method for manufacturing such an electrode.

BACKGROUND INFORMATION

The electrification of the automobile is presently being vigorously advanced, with research focusing, in particular, on the lithium ion battery. To be of interest to the consumer, batteries for uses in electric cars must ensure a long service life (>10 years). This means that the cell voltage and the energy being released during a discharge should still equal ≥90% of the initial values, even after 10 years. These requirements have yet to be met in the case of so-called high energy materials, such as high energy NCM ($LiMO_2$: $Li_2MnO_3$ with m=nickel (Ni), cobalt (Co), manganese (Mn). The HE-NCM so far supplies high start voltages, but manifests a significant loss in the voltage level (voltage fade) during the course of the service life, accompanied by a drop in capacity (capacity fade). For this reason, the in principle highly interesting material HE-NCM is so far unsuitable for commercial exploitation.

To reduce the drop in capacity, the main approach in the literature is to coat the material with, for example, $Al_2O_3$, $LiAlOx$, $ZrO_2$, $TiO_2$, $AlPO_4$, LiPON, etc. (cf. I. Bloom, et al., J. Power Sources 2013), two fundamental approaches for material coatings include: for one, the coating of the starting powder, i.e., of the primary particles and secondary particles, for another, the coating of a finished laminated electrode, in which the cathode material is already processed. The drop in capacity is reduced, but even with these approaches, it continues to remain critical.

To reduce the voltage drop, it is, in principle, conceivable based on the previous findings in the literature to dope redox-inactive elements, such as Mg(II) and Sn(IV), which show no change in the oxidation level and no undesirable migration within the material during the cyclization, and thus stabilize the structure of the material. Dopings of HE-NCM with Mg and Sn is known in the literature. The introduction of redox-inactive elements reduces the drop in voltage and the capacity over time, however, this is associated with an undesirable loss of starting capacity and starting voltage of the cell.

Thus, an object of the present invention is to increase the service life of a lithium ion cell or lithium ion battery, in particular, a HE-NCM lithium ion battery.

SUMMARY

The present invention relates to an electrode, in particular, a cathode, for an electrochemical energy store, in particular, for a lithium cell, including particles having a first lithiatable active material, which is based on a transition metal oxide,
the particles or
a base body including the particles
being provided at least partially with a functional layer, which is lithium ion-conductive and includes at least one redox-active element.

The present invention also an relates to an energy store, in particular, for a lithium cell, including such an electrode.

An electrochemical energy store within the meaning of the present invention may be understood to mean, in particular, any battery. In addition to a primary battery, an energy store may include, in particular, primarily a secondary battery, i.e., a rechargeable accumulator. A battery in this case may be or include a galvanic element or a plurality of galvanic elements connected to one another. An energy store may, for example, include a lithium-based energy store such as, for example, a lithium-ion battery. A lithium-based energy store in this case, such as, for example, a lithium-ion battery, may be understood, in particular, to mean a type of energy store whose electrochemical processes during a charge or discharge operation are based at least partly on lithium ions. Such an energy store in this case may be used as a battery for laptop applications, PDA applications, mobile phone applications and other consumer applications, power tools, garden tools, as well as hybrid vehicles, plug-in hybrid vehicles and electric vehicles.

A lithium cell may be understood to mean, in particular, an electrochemical cell, the anode of which (negative electrode) includes lithium. It may in such a case be a lithium-ion cell, a cell, the anode (negative electrode) of which includes intercalation material, for example, graphite and/or silicon, in which lithium is reversibly storable and removable, or a lithium metal cell, a cell having an anode (negative electrode) made of metallic lithium or a lithium alloy.

A particle within the meaning of the present invention may be understood to mean, for example, primary particles and secondary particles of the starting powder. Primary particles are defined as the smallest starting particle units of the powder, which are created as a stable form or an intermediary during the manufacturing process and are able to react with one another to form the larger secondary particles. Thus, these secondary particles form as a result of coagulation of the primary particles to form larger units (=aggregates as a result of chemical bonding and/or agglomerates as a result of, for example, van der Waals' interactions).

A base body within the meaning of the present invention may be understood to mean, in particular, a finished, processed electrode material, which contains, or is made of, the particles including the first lithiatable active material. In addition to the particles, the base body may include at least one conductive additive and/or at least one binder. If necessary, a coating of the material particles or of the base body using, for example, $Al_2O_3$, $AlF_3$, $LiAlO_x$, $ZrO_2$, $TiO_2$, $AlPO_4$, LiPON (lithium phosphorous oxynitride) or any other compounds, which reduce a transition metal dissolution and other material-electrolyte interactions ("single particle coating") may also be present.

In addition, an active material within the meaning of the present invention may be understood to mean a material, which participates, in particular, in a charge operation or discharge operation and, thus, may constitute the actual active material. As mentioned above, a suitable conductive additive, which includes, in particular, one from the group of elementary carbons such as, for example, carbon black, graphite, nanotubes, and a suitable binder, which includes, in particular, one from the group of natural or synthetic polymers such as, for example, PVDF (polyvinylidene fluoride), alginates, styrene butadiene rubber (SBR), polyethylene glycol, polyethylenimine, may, in principle, also be disposed in the electrode, in addition to the active material or active materials as such.

A lithiatable material may be understood to mean, in particular, a material, which is able to reversibly absorb lithium ions and to discharge them again. A lithiatable material may, for example, be intercalatable with lithium ions and/or may be alloyable with lithium ions and/or may absorb lithium ions and discharge them again during phase transition. The lithiatable electrode active material may, for example, be an electrode active material intercalatable with lithium ions. Thus, the lithiatable electrode active material may be referred to as active storage material. The electrode active material present simultaneously with a lithium ion (Li*) and an electron may store the lithium ion, for example, also referred to as intercalation, and release it again depending on the voltage, also referred to as deintercalation.

A transition metal oxide may be understood to mean, in particular, a substance class, which contains the oxygen compounds of the transition metals. Transition metals are the elements having the atomic numbers 21-30, 39-48, 57-80 and 89-112 in the Periodic Table of Elements.

A redox-active element, in particular, within the meaning of the present invention may be understood to mean that the element shows a change in the oxidation state, i.e., an oxidation or reduction, while undergoing a charge operation and/or discharge operation in the range of, for example, 2.0 V-4.8 V.

A functional layer may be understood to mean, in particular, a protective layer, which prevents an interaction of the active material with an electrolyte, for example, when used in a lithium cell, and thus protects the electrode against loss of active material.

A doping is understood to mean the exchange of one element in a chemical compound for another element, namely, a doping element. Within the scope of the present invention, this means preferably the complete or proportional exchange of one transition metal element (cf. above) for another transition metal element in a transition metal oxide.

The present invention is based on the finding that the drop in capacity arises as a result of a dissolution of the transition metals of the electrode in the electrolyte, which in turn results in a separation of lithium-containing transition metal compounds on the anode and, therefore, in less lithium available. The provision of the functional layer according to the present invention, which is lithium ion-conductive and includes at least one redox-active element, provides a very effective protection of the electrode material against a loss or a dissolution of the transition metal or transition metals in the electrolyte. A redox-active element in this case may also be understood to mean a compound of a redox-active element. In other words, this means that the functional layer having the at least one redox-active element functions as kind of barrier, which, as a result of these redox-active elements, prevents an interaction of the active material of the particles with an electrolyte, for example, when used in a lithium cell, and thus prevents a dissolution or an elutriation of the transition metal. This results in a reduction in the drop of capacity and, thus, in an increase in the service life of the lithium cell or lithium battery.

It is advantageous if the first lithiatable active material is based on the general chemical formula $(Li(Ni_xCo_yMn_{1-x-y})O_2$, x being in the range of greater than or equal to 0 to less than or equal to 1 and y in the range of greater than or equal to 0 to less than or equal to 1, with x preferably in the range of greater than or equal to 0.2 to less than or equal to 0.8 and y in the range of greater than or equal to 0 to less than or equal to 0.5, and most preferably, with x in the range of greater than or equal to 0.3 to less than or equal to 0.45 and y in the range of greater than or equal to 0.2 to less than or equal to 0.35. The active material in this case may be based on a nickel-cobalt manganate (NCM), for example, $LiMn_{1/3}Ni_{1/3}Co_{1/3}O_2$. The first lithiatable active material may also include a doping such as, for example, the dopings known in the literature having low proportions of Sn(IV) and/or Mg(II), or having redox-active elements, such as W(IV), Nb(IV), Mo(IV) or the like.

It is further advantageous if at least a plurality of particles and/or the base body also includes at least one second lithiatable active material, which is doped with at least one redox-active doping element. The second lithiatable active material in this case is based preferably on a doped manganese oxide, in particular of the general chemical formula $Li_2Mn_{1-z}M_zO_3$, with z being in the range of greater than 0 to less than 1, in particular, in the range of greater than or equal to 0.01 to less than or equal to 0.3, and most preferably in the range of greater than or equal to 0.01 to less than or equal to 0.2, and M being the redox-active element.

This measure is based on the finding that the voltage drop explained at the outset is caused mainly by deficient structural stability (structural change) of the electrode material or of the active material of the electrode. Specifically, oxygen gaps which favor the migration of transition metals and, as a result, the voltage drop, for example, due to accumulation of transition metal on the lithium, form in the electrode material during activation of the lithiatable active material or the doped transition metal of the lithiatable active material. This measure therefore offers the advantage that with the provision of at least one second lithiatable active material, which is doped with at least one redox-active doping element, less oxygen is irreversibly split off during activation of the second lithiatable active material, i.e., during the first formation cycle, in which the electrochemically inactive second lithiatable active material is activated, than in the case of an undoped material or material doped with a redox-inactive element. This results in a stabilization of the structure and, therefore, of the voltage level, since fewer voids form in the electrode material through which the transition metals are able to later migrate and thus modify or destabilize the structure. Thus, the electrode or the electrode material of the electrode may be safeguarded not only from a dissolution of the transition metals and the accompanying drop in capacity, but may also be structurally stabilized, thereby preventing (or at least drastically reducing) the drop in voltage. Accordingly, an electrochemical energy store with an increased service life may be provided. A lithium ion accumulator, for example, may be provided having a doped HE-NCM cathode and a graphite anode, which after formation has a voltage and capacity retention of 98.0% after 3000 charge cycles and discharge cycles in relation to the starting values.

It is also particularly advantageous if the second lithiatable active material is doped with the redox-active element from the functional layer as the doping element. As independent analytical and electrochemical studies have shown, the significant advantage of this measure is that during the coating of the particles or the base body including the particles, the second lithiatable active material may also be doped in one method step. In other words, this means that in the step of coating, i.e., the provision of the functional layer, which includes the at least one redox-active element, the latter may also be simultaneously introduced as the doping element into the electrode material, i.e., the lithiatable active material. Thus, with only one method step, the two central problems of the HE-NCM are solved in a very efficient and cost effective manner, namely, the drop in capacity by the functional layer according to the present invention and the drop in voltage by the doping of the active material with the redox-active doping elements originating from the functional layer.

As explained at the outset, the HE-NCM materials are particularly well suited as electrode materials, since they are able to provide particularly high starting voltages. The first lithiatable active material may, purely as an example, be formed as NCM material $LiMn_{1/3}Ni_{1/3}Co_{1/3}O_2$, which, as a result of doping with a redox-active material M and an addition of additional lithium and/or additional manganese and also oxygen ions for charge compensation, may include areas which form the second lithiatable active material and, for example, may include $Li_2Mn_{1-z}M_zO_3$, which are structurally integrated into the NCM material. The aforementioned doped $Li_2Mn_{1-z}M_zO_3$-like areas of the second lithiatable active material, in particular, may have the effect of stabilizing the active material structure and improving the discharge capacity.

If is further advantageous if the base body includes a gradient of the redox-active doping element pointing in its thickness direction. The gradient of the redox-active doping element preferably decreases from the functional layer, for example, toward a metal carrier, since the interaction of the active material with the electrolyte takes place primarily in the surface area and the costs are thereby reduced by the redox-active doping elements when the redox-active doping element preferably appears in this area.

It is further advantageous if the redox-active element includes at least one ion radius, which is in the range of greater than or equal to 50 pm to less than or equal to 80 pm, in particular, in the range of greater than or equal to 60 pm to less than or equal to 70 pm, most preferably in the range of greater than or equal to 65 pm to less than or equal to 69 pm. The ion radii in this case refer to values according to Shannon (cf., for example, http://abulafia.mt.ic.ac.uk/Shannon/ptable.php, as of Mar. 21, 2014) The expansion of the crystal lattice, for example, characterized by the increase in the lattice parameters a, b and/or c during the cyclization favors the migration of the transition metals. Test series have shown that elements having an ion radius in the range of greater than or equal to 50 pm to less than or equal to 80 pm, in particular in the range of greater than or equal to 60 pm to less than or equal to 70 pm, most preferably in the range of greater than or equal to 65 pm to less than or equal to 69 pm, offer protection against a dissolution of the transition metals and reduce the expansion of the crystal lattice in the electrode material or active material. Thus, the drop in capacity and the drop in voltage may be further reduced and the service life of the lithium cell or lithium battery may be increased.

It is further advantageous if the redox-active element exhibits a minimal change in the ion radius during at least two successive oxidation stages, i.e., when undergoing the redox reaction, in particular, if the redox-active element exhibits an ion radius during at least two successive oxidation stages, each of which is in the range of greater than or equal to 50 pm to less than or equal to 80 pm, in particular, in the range of greater than or equal to 59 pm to less than or equal to 70 pm. Since a strong change in the ion radius during the cyclization favors the migration of the transition metals, a minimal change in the ion radius of the redox-active material may provide a better protection against a dissolution of the transition metals and may further stabilize the electrode material.

It is also advantageous if the redox-active element is also a transition metal. The transition metals include largely incompletely occupied d-orbitals in contrast to the main group metals. This often results in more oxidation stages, which the transition metal may occupy. In addition, the lithium layer oxides of the transition metals Ni, Co and Mn provide electrochemical potentials of interest for automotive applications (preferably high voltage level and high capacity).

It is further advantageous if the at least one redox-active element is niobium, in particular, niobium(IV), or tungsten, in particular, tungsten (IV), or molybdenum, in particular, molybdenum (IV). Nb(IV), W(IV) and Mo(IV) are preferred, insofar as they have an ion radius very similar to that of tin(IV) known as a structural stabilizer, but are redox-active with a smaller change in the ion radius. This measure, first of all, further improves the protective effect of the functional layer. For another, the HE-NCM materials are activated only during the formation with irreversible separation of oxygen. Thus, in the case of an HE-NCM in the initially electrochemically still inactive second lithiatable active material (for example $Li_2MnO_3$), the Mn(IV) may be proportionately replaced by an electrochemically active doping element such as, for example, Nb(IV), W(IV) or Mo(IV). This lowers the necessary activation of the material and, therefore, the irreversible oxygen loss of the material. This results in a stabilization of the structure and, therefore, the voltage level, since fewer voids form in the electrode material through which the transition metals (primarily Ni and Mn) may later migrate and thus modify or destabilize the structure. Consequently, a niobium-coated, tungsten-coated or molybdenum-coated or doped HE-NCM may be provided, which combines the structure-stabilizing advantages with a gain in the starting voltage and starting capacity, and which at the same time provides an optimum protection against loss of transition metal from the active material, as compared to the particles coated with conventional materials.

Accordingly, the particles or the base body including the particles may include a mixture or composite, which is based, for example, on the general chemical formula x(Li(Ni,Co,Mn)$O_2$): 1-x ($Li_2Mn_{1-z}M_zO_3$), with x and z each being in the range of greater than 0 to less than 1 and M standing, for example, for Nb, W or Mo. The mixture of NCM with other tungsten oxides, molybdenum oxides and niobium oxides is also conceivable, however. The range of greater than or equal to 0.2 to less than or equal to 0.7, and most preferably, the range of greater than or equal to 0.3 to less than or equal to 0.55 is, in particular, preferable for x.

The synthesis of the particles may be carried out, for example, as follows using a co-precipitation method:

Ni, Co, Mn and Nb salt+$Na_2CO_3$+$NH_4OH$ (chelating agent)

50° C. water bath 12 hours.

mix with LiOH calcinate and quench in liquid $N_2$.

For coating the primary particles and/or secondary particles, the powder thus obtained is mixed and filtered out in water or in another dispersion medium together with at least one compound containing Nb and/or W and/or Mo (for example, Li7La3Nb2013, Li7NbO6, Li3NbO4, LiTiNb2O9, Li6WO6, Li4WO5, Li6W2O9, $Li_{8-x}Zr_{1-x}Nb_xO_6$ or the like). The filter residue is dried for 10 hours at 105° C. and subsequently annealed for 5 hours at 450° C.

However, other conventional synthesis methods for producing inorganic solid compounds may also be used, for example, direct thermal solid-solid reactions, reactions in melts and others, which may optionally also be supplemented by subsequent crushing methods such as, for example, ball milling.

The present invention also relates to a method for manufacturing an electrode for an electrochemical energy store, in particular, of the first alternative of the previously described electrode, the method including the following steps:

- providing particles including at least one first lithiatable active material, which is based on a transition metal oxide;
- coating the particles with a functional layer, which is lithium ion-conductive and includes a redox-active element;
- adding a conductive additive and a binder;
- dry pressing the components from the group made up of the particles having the functional layer, the conductive additive and the binder, or dispersing the components from the group made up of the particles having the functional layer, the conductive additive and the binder in a solvent, in particular, in N-methyl-2-pyrrolidone;
- applying, in particular, knife coating, the dispersion thus obtained on a metal carrier, in particular, on an aluminum foil; and
- if necessary, drying the dispersion ("single particle coating").

The coating of the particles having the functional layer according to the present invention may be carried out with the aid of conventional methods such as, for example, sputtering, co-precipitation, etc., of a HE-NCM powder with the compounds $Li_7La_3Nb_2O_{13}$, $Li_7NbO_6$, $Li_3NbO_4$, $LiTiNb_2O_9$, $Li_6WO_6$, $Li_4WO_5$, $Li_6W_2O_9$, $Li_{8-x}Zr_{1-x}Nb_xO_6$ or the like.

A conductive additive within the meaning of the present invention is understood to mean the addition of one or multiple material(s), which increase the electrical conductivity of the electrode through the formation of a continuous conductive network between the active material particles and the conductor. The conductive additive used may, for example, be carbon black, graphite and/or carbon nanotubes or the like.

N-methyl-2-pyrrolidone is a lactam of N-methylamino butyric acid, i.e., a gamma lactone and is used as an organic solvent in diverse reactions, among others, in the slurry preparation for manufacturing battery electrodes.

The subject matter of the present invention is also a method for manufacturing an electrode for an electrochemical energy store, in particular, of the second alternative of the previously described electrode, the method including the following steps:

- providing particles including at least one first lithiatable active material, which is based on a transition metal oxide;
- adding a conductive additive and a binder;
- dry pressing the components from the group made up of the particles having the functional layer, the conductive additive and the binder, or dispersing the components from the group made up of the particles having the functional layer, the conductive additive and the binder in a solvent, in particular, in N-methyl-2-pyrrolidone;
- applying, in particular, knife coating, the dispersion thus obtained on a metal carrier, in particular, on an aluminum foil in order to form a base body including the particles;
- if necessary, drying the dispersion;
- coating the base body with a functional layer, which is lithium ion-conductive and includes a redox-active element ("laminate coating").

The coating of the base body or the finished laminated electrode having the functional layer according to the present invention may be carried out with the aid of methods known to those skilled in the art such as, for example, atomic layer deposition or sputtering using the compounds $Li_7La_3Nb_2O_{13}$, $Li_7NbO_6$, $Li_3NbO_4$, $LiTiNb_2O_9$, $Li_6WO_6$, $Li_4WO_5$, $Li_6W_2O_9$, $Li_{8-x}Zr_{1-x}Nb_xO_6$ or the like.

On the one hand, a protective functional layer for the active material may be provided in a very simple manner by the method according to the present invention, in order to prevent a dissolution or an elutriation of the transition metals (primarily Ni and Mn) and the accompanying drop in capacity. On the other hand, the methods also offer the significant advantage that a part of the redox-active element of the functional layer may be introduced as a doping element into the active material during the coating of the particles or the base body. In this way, the redox-active elements or transition metals, such as Nb, Mo and/or W, are doped into the active material, resulting in a structural stabilization. The latter—as previously explained—is attributed to the fact that less oxygen is irreversibly separated (=fewer oxygen voids) during the first formation cycle in which the electrochemically inactive $Li_2MnO_3$ component is activated, than in the case of the undoped HE-NCM material. Accordingly, the two central problems of the HE-NCM may be addressed for with only one method step, namely, the drop in capacity by the coating of the particles or the base body with the functional layer according to the present invention as well as the drop in voltage by the simultaneous doping of the active material with the redox-active doping elements originating from the functional layer.

Thus, it is possible, for example, during the precipitation process of the powder to eliminate a mixing of Nb, Mo and/or W compounds and a coating according to known methods, in order to then simultaneously introduce in one single process step the material doping for combating the voltage fade and the layer protection for combating the capacity fade.

With such a method, it is possible, in particular, to manufacture an electrode for an electrochemical energy store. This may include, in particular, the advantages which were explained with reference to the electrode. In summary, such an energy store may yield advantages with respect to the voltage level and the capacity.

BRIEF DESCRIPTION OF THE DRAWINGS

The present invention is described by way of example in greater detail below with reference to the figures.

DETAILED DESCRIPTION OF EXAMPLE EMBODIMENTS

Figure 1:
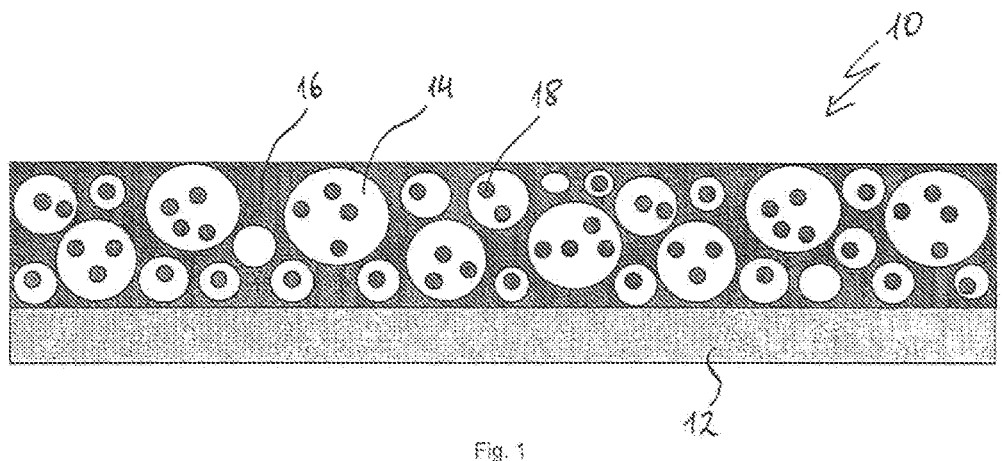
FIG. 1 shows a schematic representation of an electrode according to a first exemplary embodiment of the present invention.

An electrode is depicted in FIG. 1, which is indicated in its entirety by reference numeral 10. Electrode 10 includes a metal carrier 12. Metal carrier 12 may include aluminum or may be designed as an aluminum foil 12. Metal carrier 12 in this case may serve as an conductor, in particular, a cathode conductor, in a lithium cell or lithium battery.

Figure 2:
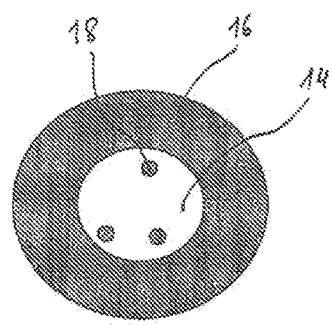
FIG. 2 shows a schematic representation of a particle coated with a functional layer according to the present invention.

Electrode 10 also includes a plurality of particles 14, which are situated on metal carrier 12 or on aluminum foil 12. Particles 14 in this case include one first lithiatable active material, which is based on a transition metal oxide. As is apparent from FIG. 2, particles 14 are provided or coated with a functional layer 16. Particles 14 may be completely or also only partly surrounded by functional layer 16. For reasons of illustration, the separate delineation of the functional layers 16 of all particles 14 in FIG. 1 was omitted. It is quite conceivable that a number of particles 14 is situated on the surface of electrode 10 and projects from the surface without being covered by functional layer 16.

Functional layer 16 according to the present invention is, in this case, lithium ion-conductive and includes a redox-active element or a compound of a redox-active element. Because of the redox-active element, functional layer 16 is formed in such a way that it prevents an interaction of the active material with an electrolyte, for example, when used in or during operation of a lithium cell, and thus protects the electrode against loss of transition material. The coating of particles 14 having functional layer 16 according to the present invention may be carried out with the aid of methods known to those skilled in the art such as, for example, sputtering, co-precipitation, etc., of a HE-NCM powder using the compounds $Li_7La_3Nb_2O_{13}$, $Li_7NbO_6$, $Li_3NbO_4$, $LiTiNb_2O_9$, $Li_6Wo_6$, $Li_4WO_5$, $Li_6W_2O_9$, $Li_{8-x}Zr_{1-x}Nb_xO_6$ or the like.

As further depicted in FIG. 1, a large portion of particles 14 also includes a redox-active doping element 18. Specifically, these particles 14 include one second lithiatable active material, which is doped with redox-active doping element 18. It is conceivable that all particles 14 are doped with redox-active doping element 18 or include the doped second lithiatable active material. It is preferable in this case if redox-active doping element 18 corresponds to the redox-active element of functional layer 16 or originates from functional layer 16.

Electrode 10 in this case may, in principle, include a suitable conductive additive and a suitable binder (not depicted), in addition to the active material or the active materials as such. These components, i.e., the active material, the conductive additive and the binder, form the electrode material of electrode 10.

Figure 3:
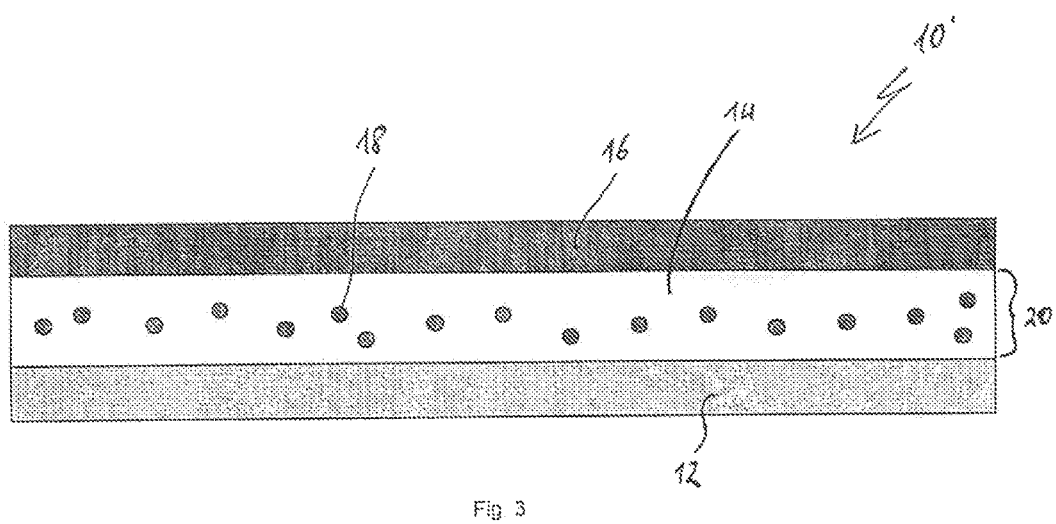
FIG. 3 shows a schematic representation of an electrode according to another exemplary embodiment of the present invention.

FIG. 3 depicts an electrode 10' of another specific embodiment according to the present invention. Electrode 10', similar to electrode 10 from FIG. 1, includes a metal carrier 12, which is likewise preferably designed as an aluminum foil 12.

A base body 20 is situated on metal carrier 12, which includes particles 14 or is made up of particles 14. The individual particles 14 in this case are uncoated and also include the first lithiatable active material, which is based on a transition metal oxide. Electrode 10' or base body 20 in this case may also include a suitable conductive additive and a suitable binder (not depicted).

As is also apparent from FIG. 3, base body 20 is provided with functional layer 16. Functional layer 16 in this case, similar to the first exemplary embodiment, is lithium ion-conductive and includes the at least one redox-active element or the at least one compound of the redox-active element. Due to its composition, functional layer 16 is designed in such a way that it prevents an interaction of the active material with an electrolyte, for example, when used in, or during operation of a lithium cell, and thus, protects the electrode against loss of transition metal. Electrode 10' is preferably already laminated before base body 20 is coated with functional layer 16. The coating may be carried out with the aid of methods known to those skilled in the art such as, for example, atomic layer deposition using the compounds $Li_7La_3Nb_2O_{13}$, $Li_7NbO_6$, $Li_3NbO_4$, $LiTiNb_2O_9$, $Li_6WO_6$, $Li_4WO_5$, $Li_6Wo_2O_9$, $Li_{8-x}Zr_{1-x}Nb_xO_6$ or the like.

Electrode 10' or base body 20 also includes a redox-active doping element 18. Specifically, base body 20 or particles 14 of base body 20 include one second lithiatable active material, which is doped with redox-active doping element 18. In this case, it is preferred if redox-active doping element 18 corresponds to the redox-active element of functional layer 16 or originates from functional layer 16. In addition, base body 20 may include a gradient of redox-active doping element 18 pointing in its thickness direction. The gradient of redox-active doping element 18 may decrease from functional layer 20 toward metal carrier 12.

Figure 4:
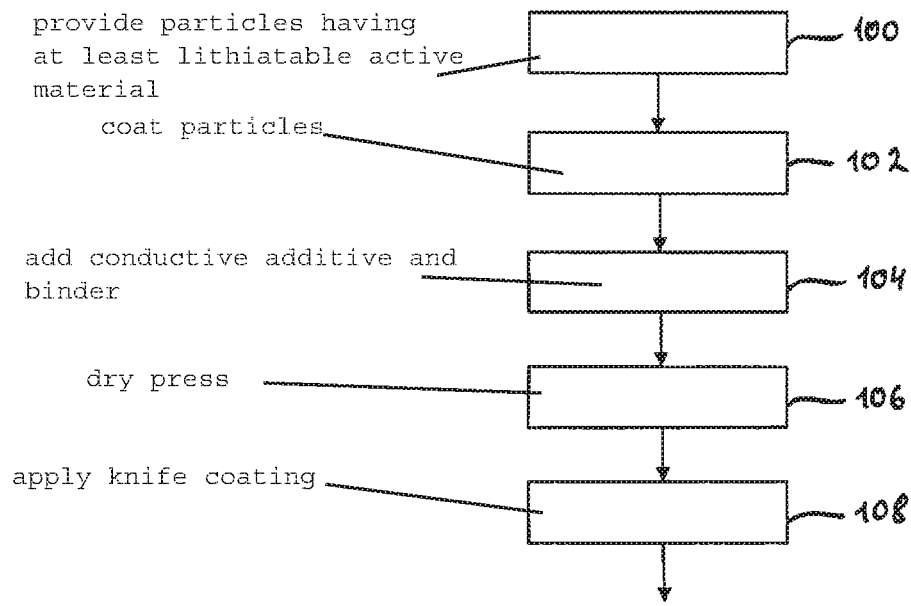
FIG. 4 shows a flow chart of a method for manufacturing an electrode according to FIG. 1.

FIG. 4 shows a flow chart of a method for manufacturing an electrode 10, in particular, a cathode for a lithium cell, according to FIG. 1 ("single particle coating"). The method includes a step 100 of providing particles 14 having at least one first lithiatable active material, which is based on a transition metal oxide, a step 102 of coating particles 14 with a functional layer 16, which is lithium ion-conductive and includes a redox-active element, a step 104 of adding a conductive additive and a binder, a step 106 of dry pressing the components from the group made up of particles 14 with functional layer 16, the conductive additive and the binder or a step 104 of dispersing the components from the group made up of particles 14 having functional layer 16, the conductive additive and the binder in a solvent, in particular, in N-methyl-2-pyrrolidone, a step 108 of applying, in particular, knife coating, the dispersion thus obtained on a metal carrier 12, in particular, on an aluminum foil 12; and if necessary, a step of drying the dispersion.

Figure 5:
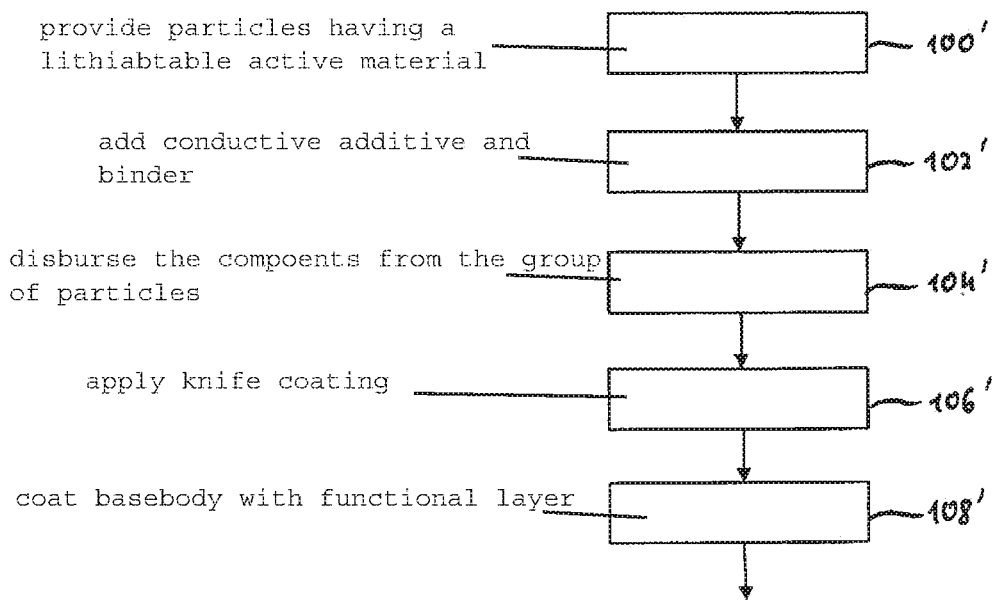
FIG. 5 shows a flow chart of a method for manufacturing an electrode according to FIG. 3.

FIG. 5 shows a flow chart of a method for manufacturing an electrode 10', in particular, a cathode for a lithium cell, according to FIG. 3 ("laminate coating"). The method includes a step 100' of providing particles 14 having at least one lithiatable active material, which is based on a transition metal oxide, a step 102' of adding a conductive additive and a binder, a step 104' of dry pressing the components from the group made up of particles 14, the conductive additive and the binder, or a step 104' of dispersing the components from the group made up of particles 14, the conductive additive in a solvent, in particular, in N-methyl-2-pyrrolidone, a step of applying 106', in particular, of knife coating 106', of the dispersion thus obtained to a metal carrier 12, in particular to an aluminum foil 12, in order to form a base body 20 including particles 14, if necessary a step of drying the dispersion and a step 108' of coating base body 20 with a functional layer 16, which is lithium ion-conductive and includes a redox-active element.

With the method according to the present invention, a functional layer 16 having at least one redox-active element in or on an electrode may be provided, which offers an effective protection of the electrode material or active material against loss of transition metal. This results in a significant reduction in the loss of capacity. On the other hand, a part of this redox-active element, however, may also be utilized in order to be introduced into and to stabilize the active material of particles 14. Thus, with only one method step, namely coating 100 of particles 14 and coating 108' of base body 20, it is possible to provide a protective effect in the form of functional layer 16, as well as to implement a structure stabilization by doping the active material of particles 14 and of base body 20 with a redox-active doping element 18 from functional layer 16.

What is claimed is:

1. An electrode for an electrochemical energy store, including particles having a first lithiatable active material, which is based on a transition metal oxide, wherein at least one of the particles and a base body including the particles is provided at least partly with a functional layer which is lithium ion-conductive and includes at least one redox-active element, wherein at least one of: a plurality of particles and the base body also includes at least one second lithiatable active material, which is doped with at least one redox-active doping element, and wherein the at least one second lithiatable active material is doped with the redox-active element from the functional layer.

2. The electrode as recited in claim 1, wherein the first lithiatable active material is based on a general chemical formula $(Li(Ni_xCo_yMn_{1-x-y})O_2$, x being in the range of greater than or equal to 0 to less than or equal to 1 and y in the range of greater than or equal to 0 to less than or equal to 1.

3. The electrode as recited in claim 2, wherein x is in the range of greater than or equal to 0.2 to less than or equal to 0.8 and y in the range of greater than or equal to 0 to less than or equal to 0.5.

4. The electrode as recited in claim 3, wherein x is in the range of greater than or equal to 0.3 to less than or equal to 0.45 and y in the range of greater than or equal to 0.2 to less than or equal to 0.35.

5. The electrode as recited in claim 1, wherein the second lithiatable active material is based on a doped manganese oxide.

6. The electrode as recited in claim 5, wherein the second lithiatable active material is based on the general chemical formula $Li_2Mn_{1-z}MzO_3$, with z being in the range of greater than 0 to less than 1 and M is the redox-active element.

7. The electrode as recited in claim 6, wherein z is in the range of greater than or equal to 0.01 to less than or equal to 0.3.

8. The electrode as recited in claim 7, wherein z is in the range of greater than or equal to 0.01 to less than or equal to 0.2.

9. The electrode as recited in claim 1, wherein the base body includes a gradient of the redox-active doping element pointing in its thickness direction.

10. The electrode as recited in claim 1, wherein the redox-active element includes at least one ion radius, which is in the range of greater than or equal to 50 pm to less than or equal to 80 pm.

11. The electrode as recited in claim 10, wherein the at least one ion radius is in the range of greater than or equal to 60 pm to less than or equal to 70 pm.

12. The electrode as recited in claim 11, wherein the at least one ion radius is in the range of greater than or equal to 65 pm to less than or equal to 69 pm.

13. The electrode as recited in claim 1, wherein the redox-active element exhibits a minimal change in the ion radius during at least two successive oxidation stages.

14. The electrode as recited in claim 13, wherein the radius is in each case in the range of greater than or equal to 50 pm to less than or equal to 80 pm.

15. The electrode as recited in claim 14, wherein the radius is in each case in the range of greater than or equal to 59 pm to less than or equal to 70 pm.

16. The electrode as recited in claim 1, wherein the redox-active element is also a transition metal.

17. The electrode as recited in claim 1, wherein the at least one redox-active element is niobium.

18. The electrode as recited in claim 1, wherein the particles are coated with the functional layer;
the electrode further includes a conductive additive and a binder; and
components from a group made up of the particles, the conductive additive, and the binder are on an aluminum foil base and formed as a dry-pressed component or as a dispersion in a solvent of N-methyl-2-pyrrolidone.

19. The electrode as recited in claim 18, wherein the components are formed as the dispersion, and the dispersion is a dried dispersion.

20. The electrode as recited in claim 1, wherein:
the electrode further includes a conductive additive and a binder;
components from the group made up of the particles, the conductive additive, and the binder are on an aluminum foil base and are formed as a dry-pressed component or as a dispersion in a solvent of N-methyl-2-pyrrolidone; and
the functional layer coats a base body formed of the aluminum foil base and the particles.

21. The electrode as recited in claim 20, wherein the components are formed as the dispersion, and the dispersion is a dried dispersion.

22. The electrode as recited in claim 1, wherein the at least one redox-active element is one of the following listed items: niobium (IV), tungsten, tungsten (IV), molybdenum, and molybdenum (IV).

* * * * *